US011123871B2

(12) United States Patent
Johnson et al.

(10) Patent No.: US 11,123,871 B2
(45) Date of Patent: Sep. 21, 2021

(54) SYSTEMS AND METHODS AUTONOMOUSLY PERFORMING INSTRUCTED OPERATIONS USING A ROBOTIC DEVICE

(71) Applicant: Walmart Apollo, LLC, Bentonville, AR (US)

(72) Inventors: Christopher D. Johnson, Bentonville, AR (US); Timothy Mark Fenton, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 293 days.

(21) Appl. No.: 16/395,418

(22) Filed: Apr. 26, 2019

(65) Prior Publication Data

US 2019/0329413 A1 Oct. 31, 2019

Related U.S. Application Data

(60) Provisional application No. 62/663,018, filed on Apr. 26, 2018.

(51) Int. Cl.
*B25J 9/16* (2006.01)
*G06Q 20/20* (2012.01)

(52) U.S. Cl.
CPC .......... *B25J 9/1679* (2013.01); *B25J 9/1697* (2013.01); *G06Q 20/204* (2013.01); *G05B 2219/50391* (2013.01)

(58) Field of Classification Search
USPC ................................................ 700/245–264
See application file for complete search history.

(56) References Cited

U.S. PATENT DOCUMENTS 5,640,002 A    6/1997  Ruppert et al.
6,783,064 B1 * 8/2004  Green ................ G06Q 20/1085
                                                      235/375

(Continued)

OTHER PUBLICATIONS

Zanorex, Automating Credit Card Swipe w/ POS device, Automating Credit Card Swipe w/ POS device : Automation Discussions | Ranorex Forum, https://www.ranorex.com/forum/automatingcreditcardswipewposdevicet5701. html, Feb. 4, 2004.

(Continued)

*Primary Examiner* — Jonathan L Sample
(74) *Attorney, Agent, or Firm* — Fitch, Even, Tabin & Flannery LLP (57) ABSTRACT

Described in detail herein is autonomous system for performing instructed operations. A switch device in electrical communication with an autonomous robot device and a remote computing system, can replicate a first display of the autonomous robot device on a second display of the remote computing system. The switch device provides an interface for remotely controlling the autonomous robot device via the remote computing system. The autonomous robot device can control the articulated arm to move the at least one card to physically interact with a card reader. The remote computing system can autonomously extract each action performed by the autonomous robot device from the first display in response to replication of the first display on the second display via the switch device.

20 Claims, 7 Drawing Sheets

(56) References Cited

U.S. PATENT DOCUMENTS

| | | | |
|---|---|---|---|
| 6,785,845 B2 | 8/2004 | Venkataraman | |
| 7,082,521 B1 | 7/2006 | Nanja | |
| 8,132,713 B2* | 3/2012 | Kekicheff | G06Q 20/3552 |
| | | | 235/375 |
| 8,862,683 B2* | 10/2014 | Matsunaga | G06F 3/023 |
| | | | 709/208 |
| 8,898,638 B1 | 11/2014 | Righi et al. | |
| 8,996,165 B2* | 3/2015 | Wang | A61B 5/7445 |
| | | | 700/245 |
| 10,181,120 B1* | 1/2019 | Holmes | G06Q 20/204 |
| 10,556,349 B1* | 2/2020 | Alduaiji | B25J 9/1669 |
| 2001/0037163 A1* | 11/2001 | Allard | B25J 9/1689 |
| | | | 700/245 |
| 2003/0216834 A1* | 11/2003 | Allard | G05D 1/0038 |
| | | | 700/245 |
| 2005/0127173 A1 | 6/2005 | Idol | |
| 2012/0185094 A1* | 7/2012 | Rosenstein | G05D 1/0251 |
| | | | 700/259 |
| 2013/0317927 A1* | 11/2013 | Bush | H04W 4/80 |
| | | | 705/21 |
| 2014/0120235 A1* | 5/2014 | Jones | A23G 9/28 |
| | | | 426/565 |
| 2014/0180479 A1* | 6/2014 | Argue | B25J 9/0093 |
| | | | 700/259 |
| 2014/0286565 A1* | 9/2014 | Ikenaga | G06K 9/6254 |
| | | | 382/152 |
| 2014/0369792 A1* | 12/2014 | Kudrus | B25J 9/0096 |
| | | | 414/222.02 |
| 2015/0242812 A1* | 8/2015 | Nelson | G16H 40/67 |
| | | | 705/311 |
| 2015/0332407 A1* | 11/2015 | Wilson, II | G07C 5/0808 |
| | | | 705/4 |
| 2016/0034723 A1* | 2/2016 | Somani | G06Q 10/00 |
| | | | 235/438 |
| 2016/0046023 A1* | 2/2016 | Nagendran | B25J 9/1689 |
| | | | 700/248 |
| 2016/0149296 A1 | 5/2016 | Kurz et al. | |
| 2016/0327941 A1* | 11/2016 | Stiernagle | G05B 19/4155 |
| 2016/0364785 A1* | 12/2016 | Wankhede | G06Q 30/0633 |
| 2017/0270717 A1* | 9/2017 | Somani | G06Q 10/06 |
| 2017/0286940 A1* | 10/2017 | Clark | G06Q 20/20 |
| 2018/0018680 A1* | 1/2018 | Bs | G06F 11/368 |
| 2018/0089925 A1* | 3/2018 | Salijeski | B25J 11/00 |
| 2018/0154518 A1* | 6/2018 | Rossano | B25J 11/0055 |
| 2018/0218315 A1* | 8/2018 | Furnari | G06F 3/03547 |
| 2018/0253572 A1* | 9/2018 | Ryan | G06K 7/0095 |
| 2018/0304467 A1* | 10/2018 | Matsuura | B25J 9/1671 |

OTHER PUBLICATIONS

Connecting with a KVM Switch, TestPlant, http://docs.testplant.com/?q=connectingwithakvmswitch, last viewed Feb. 4, 2018.

International Search Report and Written Opinion from related International Patent Application No. PCT/US2019/029341 dated Jul. 10, 2019.

* cited by examiner

SYSTEMS AND METHODS AUTONOMOUSLY PERFORMING INSTRUCTED OPERATIONS USING A ROBOTIC DEVICE

RELATED APPLICATIONS

The present application claims priority to and the benefit of U.S. Provisional Application No. 62/663,018, filed on Apr. 26, 2018, the content of which is incorporated by reference herein in its entirety.

BACKGROUND

Autonomous remote computing systems can be configured to perform various tasks. While performing these tasks, autonomous remote computing systems can experience errors.

BRIEF DESCRIPTION OF DRAWINGS

Illustrative embodiments are shown by way of example in the accompanying drawings and should not be considered as a limitation of the present disclosure.

DETAILED DESCRIPTION

Described in detail herein is autonomous system for performing instructed operations, using a robotic device. A switch device in electrical communication with an autonomous robot device and a remote computing system, can replicate a first display of the autonomous robot device on a second display of the remote computing system. The autonomous robot device can include a controller, an articulated arm, and an image capture device. The switch device can provide an interface for remotely interfacing with and controlling the autonomous robot device via the remote computing system. The autonomous robot device can receive a first set of instructions from the remote computing system, via the interface of the switch device. The autonomous robot device can pick up a card with the articulated arm in response to the first set of instructions. The card can include a magnetic stripe or a microchip. In response to the first instructions, the autonomous robot device can also control the articulated arm to move the at least one card to physically interact with a card reader of a point of sale terminal including a processor in communication with the card reader, to facilitate reading of the magnetic stripe or microchip by the card reader. The remote computing system can autonomously extract each action performed by the autonomous robot device from the first display in response to replication of the first display on the second display via the switch device. The remote computing system can transmit a second set of instructions to the autonomous robot device via the interface of the switch device in response to detection of specified data in the first display that is replicated on the second display after the autonomous robot performs each action associated with the first set of instructions. The switch device can be a Keyboard Video Mouse (KVM) switch device.

In one embodiment, the autonomous robot device can interact with the card reader by swiping the magnetic stripe of the at least one card at the card reader or inserting the microchip of the at least one card into the card reader. The card reader can authenticate the at least one card in response to extracting and reading data encoded in the magnetic stripe or the microchip of the at least one card.

The point-of-sale terminal or the card reader can include a third display. The third display can be configured to display information associated with a response of the point-of-sale terminal or the card reader to the performance of the first set of instructions by the autonomous robot device. The autonomous robot device can be configured to stream, via the image capturing device of the autonomous robot device, one or more images including the information displayed on the third display, and to display, via the first display of the autonomous robot device. The one or more images can include information associated with the response of the point-of-sale terminal or the card reader to performance of the first set of instructions, which is displayed on the third display. The second display of the remote computing system is configured to render the one or more images including the information associated with performance of the first set of instructions. The remote computing system can extract the information associated with the first set of instructions from the image. The card reader can include a user/data input device. An action performed by the autonomous robot device can include inputting data using the user/data input device of the card reader.

Figure 1:
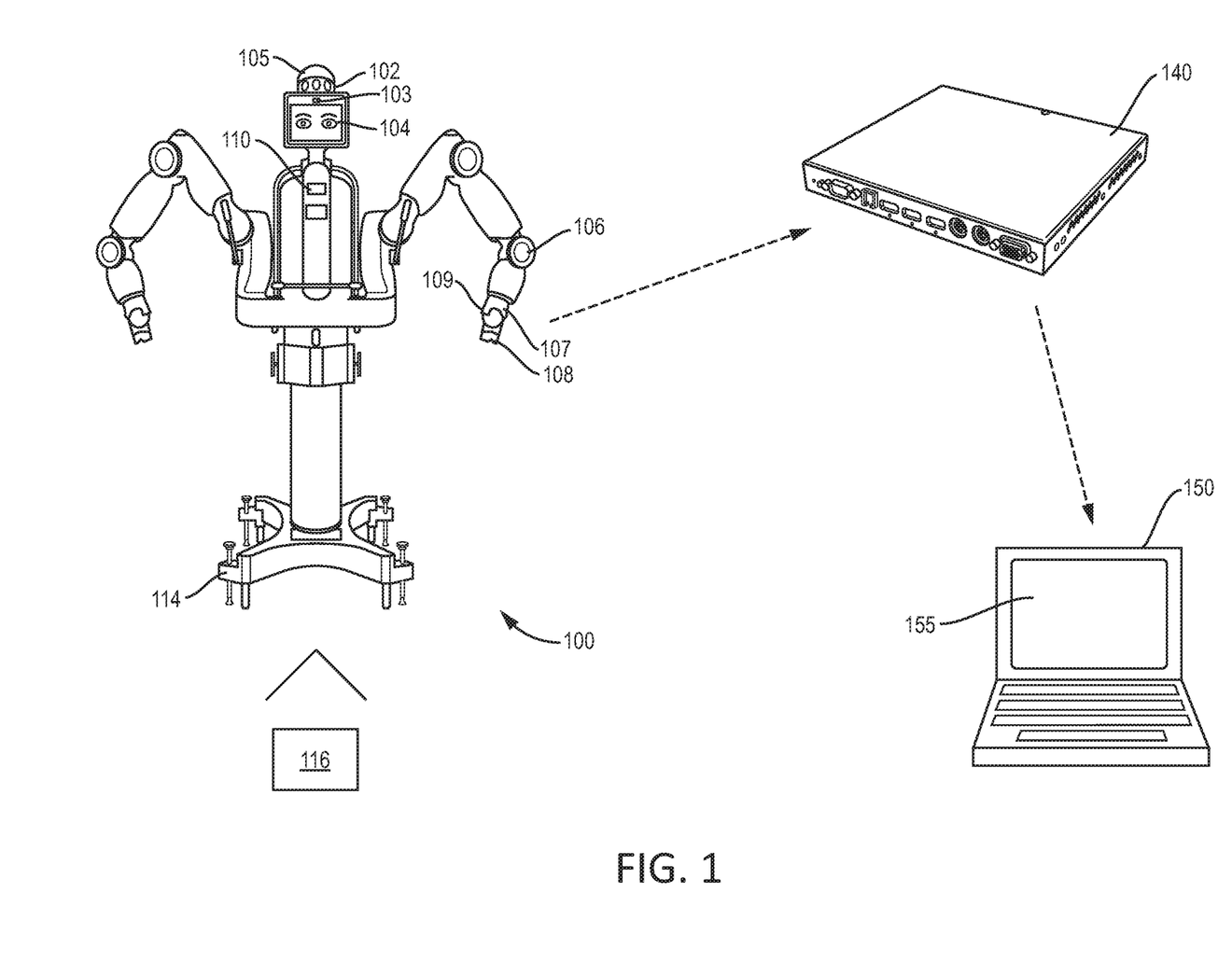
FIG. 1 is a block diagram illustrating an autonomous robot device in a facility according to exemplary embodiments of the present disclosure.

FIG. 1 is a block diagram illustrating an autonomous robot device in a facility according to exemplary embodiments of the present disclosure. The autonomous robot device 100 can include a head including status lights 102, an image capturing device 103 and a display 104. The head can also include sensors 105. The sensors 105 can be sonar sensors configured to detect moving objects. The status lights 102 can indicate the autonomous robot's state (e.g., powered on, powered off, processing information). The image capturing device 103 can capture still or moving images. The display 104 can include a graphical user interface streaming the still or moving images captured by the image capturing device 103.

The autonomous robot device 100 can include a torso extending down from the head. The torso can include two image capturing devices 110. The two image capturing devices 110 can provide a wide angle view. The autonomous robot device 100 can include two articulated arms 106 extending from the torso. Each articulated arm 106 can include a picking unit 108 attached to a wrist/joint 109. Each of the articulated arms 106 can include sensors and/or image capturing devices 107 disposed around the wrists 109. The sensors 107 can be range sensors, configured to measure distance to physical objects. The autonomous robot device 100 can also include four legs 112 extending from the torso.

In one embodiment, the four legs 112 can be immobile, keeping the autonomous robot device 100 in an upright, stationary position. Alternatively, the four legs 112 can include motive assemblies. The motive assemblies can be but are not limited to wheels, tracks, rotors, and propellers such that the autonomous robot device 100 can be mobile. The motive assemblies can facilitate 360 degree movement for the autonomous robot device 100.

The picking unit 108 can be a gripper, configured to grasp and pickup physical objects. The wrists 109 of the articulated arm 106 can twist and turn the physical object grasped by the autonomous robot device 100. The articulated arm 106 can move the picking unit 108 while, the picking unit 108 is grasping the physical object. The two image capturing devices 110 can capture still or moving images. The display 104 can render a stream of still or moving images captured by the two image capturing devices 110.

The autonomous robot device 100 can include a controller 116. The autonomous robot device 100 can be an intelligent device capable of performing tasks without human control. The controller 116 can be programmed to control an operation of the status lights 102, image capturing device 103, the display 104, the sensors 104, the articulated arms 106, the wrists 109, the sensors 107, the picking unit 108, and the two cameras 110, in response to receive instructions and/or various inputs including inputs from the image capturing device 103, the sensors 104, and the sensors 107.

The autonomous robot device 100 can be coupled to a remote communicatively computing system 150, via a switch device 140. The switch device 140 can be a Keyboard Video Mouse (KVM) switch device. The switch device 140 can provide control of the autonomous robot device 100 to the remote computing system 150, via input devices electronically coupled to the remote computing system 150, such as keyboards, video monitors and mice. The switch device 140 can include a video switch. The video switch can switch analogue video and sync pulses between the autonomous robot device 100 and the remote computing system 150 that sends and receives data from input/output devices. The switch device 140 can emulate input devices even when they are not connected directly to the autonomous robot device. The switch device 140 can be one or more of a USB Hub Based KVM, Emulated USB KVM, Semi-DDM USB KVM, or DDM USB KVM.

The remote computing system 150 can include a display 155. The display 155 can be a multi-touch interface. The remote computing system 150 can also include other input devices to control the autonomous robot device 100. The switch device 140 can replicate the display 104 of the autonomous robot device 100 onto the display of the remote computing system 150. In this regard, the remote computing system 150 can render on the display 155, the stream of still or moving images captured by the image capturing devices 103 and 110 and displayed on the display 104 of the autonomous robot device 100. The remote computing system 150 will be described in greater detail with respect to FIG. 4.

Figure 2:
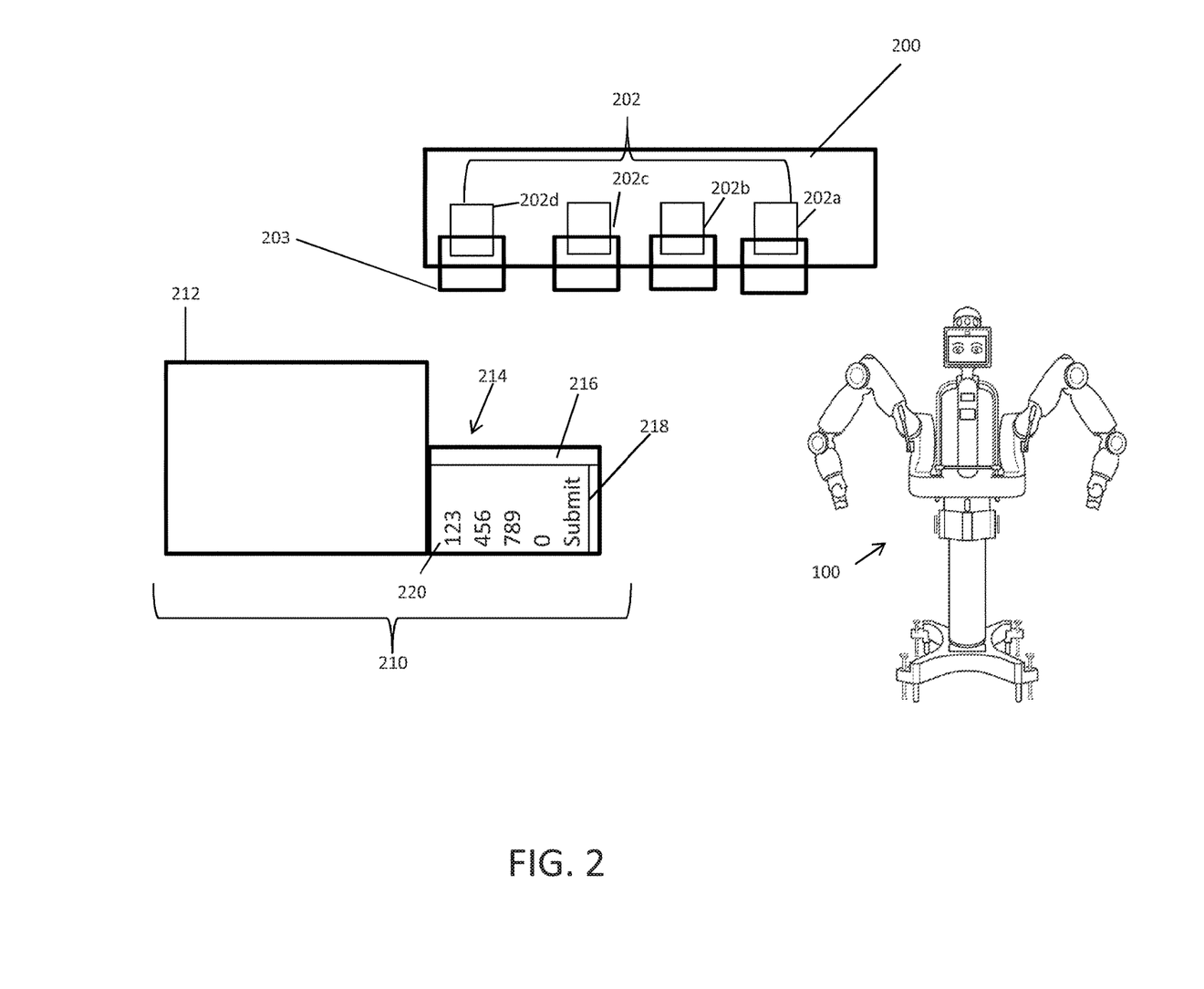
FIG. 2 is a block diagram illustrating an autonomous robot device in a facility according to exemplary embodiments of the present disclosure.

FIG. 2 is a block diagram illustrating an embodiment of the autonomous robot device 100 in a facility according to exemplary embodiments of the present disclosure. In an exemplary embodiment, cards 202 can be disposed on a storage unit 200. As an example, the cards 202 can include cards 202a-d. Each of the cards 202 can be disposed in slots and/or sleeves 203 on the storage unit 200. A terminal 210 can also be disposed in the facility. The terminal 210 can include a display 212 and a card reader 214. In some embodiments, the display 212 can be integrated with the card reader 214 or can be a stand-alone display communicatively coupled to the terminal 201 and/or the card reader 214. The card reader 214 can include a magnetic strip reader slot 216 and a microchip reader slot 218. To interact with the magnetic strip reader slot 216, a magnetic strip disposed on a card can be swiped in the magnetic stripe reader slot 216. To interact with the microchip reader slot 218, a microchip disposed on the card can be inserted in the microchip reader slot 218. The card reader 214 can also include an input device 220 such as a touchpad or keypad.

The autonomous robot device 100 can receive instructions from the remote computing system via the switch to pick-up a card 202 from the slot and/or sleeve 203 and interface with the terminal 210 and card reader 214 using the card. For example, the autonomous robot device 100 can receive instructions to pick-up card 202b from the respective slot and/or sleeve 203 and insert a microchip disposed on the card 202b in the microchip reader slot 218 and/or swipe the magnetic stripe disposed on the card 202b in the magnetic card reader slot 216. The autonomous robot device 100 can pick-up card 202b and insert a microchip disposed on the card 202b in the microchip reader slot 218 and/or swipe the magnetic stripe disposed on the card 202b in the magnetic card reader slot 216, at the terminal 210.

In response to inserting a microchip disposed on the card 202b in the microchip reader slot 218 and/or swiping the magnetic stripe disposed on the card 202b in the magnetic card reader slot 216, information associated with the card 202b, the action taken with the card 202b, or the subsequent actions to be performed can be rendered on the display 212. The image capturing devices of the autonomous robot device 100 (image capturing devices 103, 110, as shown in FIG. 1) can capture still or moving images of the information rendered on the display 212 of the terminal.

Figure 3:
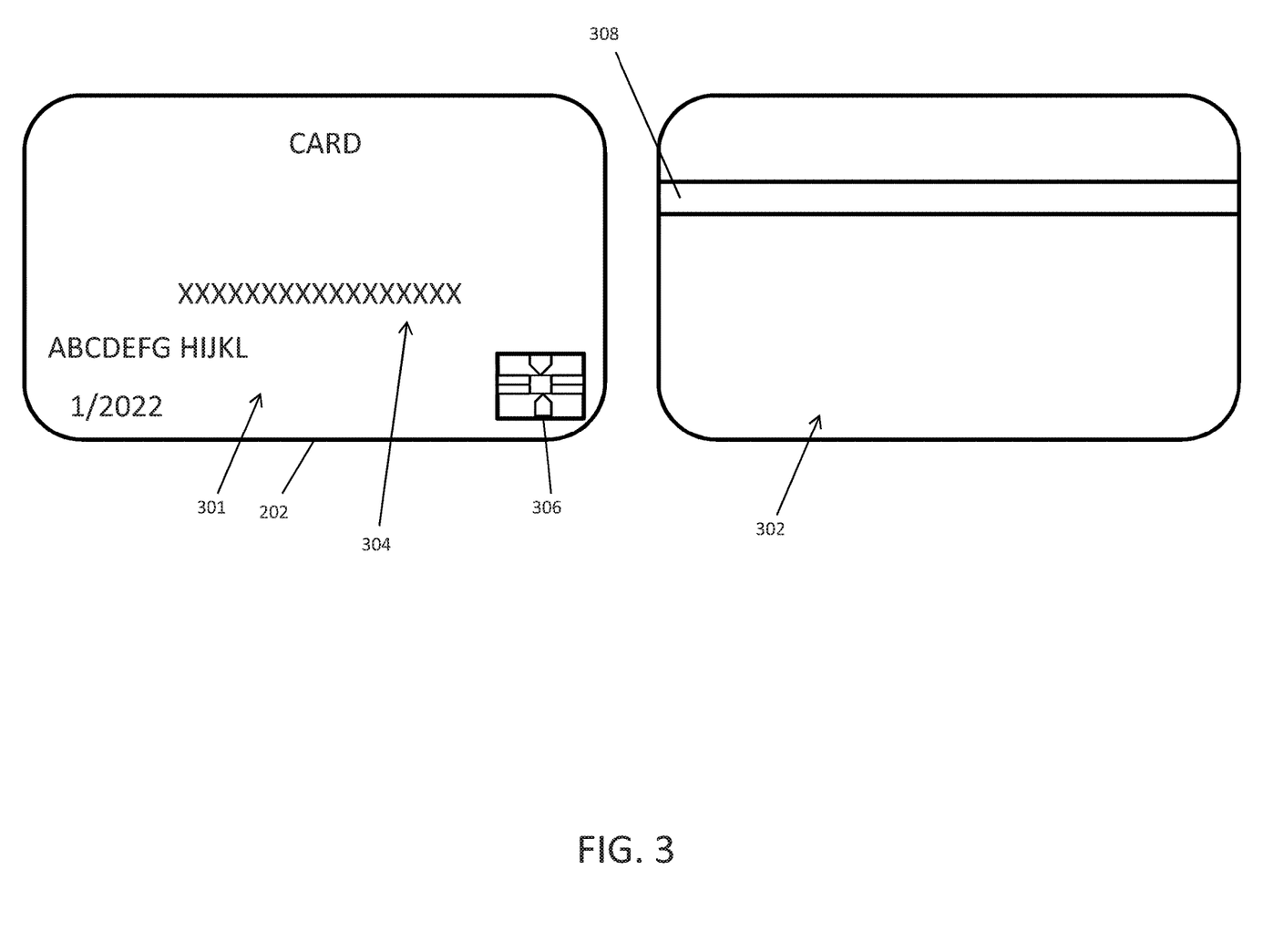
FIG. 3 illustrates a card according to an exemplary embodiment of the present disclosure.

FIG. 3 illustrates a card according to an exemplary embodiment of the present disclosure. A card 202 can include a front face 301 and a back face 302. The front face 301 can include information 304 such as an identification/card number, a name of a user of the card 202 and an expiration date. The card 202 can also include a microchip 306 disposed on the front face 301 of the card. A magnetic stripe 308 can be disposed on the back face 302 of the card 202.

The microchip 306 and the magnetic stripe 308 can be encoded with information associated with the card 202. The information can include the information 304 disposed on the front face of the card (i.e., identification number, a name of a user of the card 202 and an expiration date). In some embodiments, the encoded information can also include an address associated with the user, and information associated with the issuer of the card 202. It can be appreciated the card 202 can be one or more of a: loyalty card, gift card, credit card, debit card, insurance card, identification card, and/or any other type of card. The issuer of the card 202 can be a financial institution, retailers, insurers, governmental agencies and/or companies in various industries.

Figure 4:
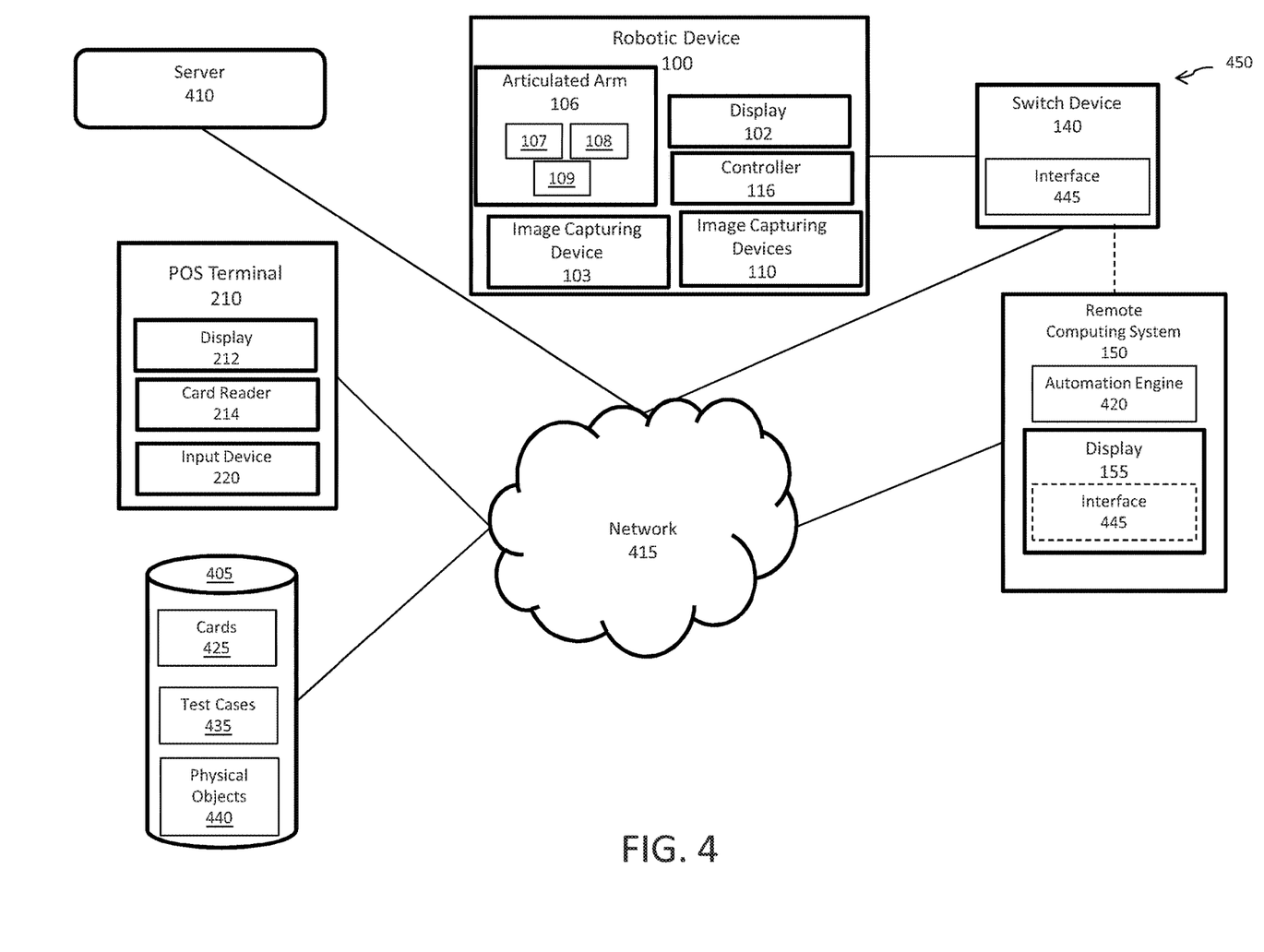
FIG. 4 is a block diagrams illustrating an autonomous system for performing instructed operations according to an exemplary embodiment.

FIG. 4 illustrates an exemplary autonomous system 450 for performing instructed operations in accordance with an exemplary embodiment. The autonomous system 450 for performing instructed operations can include one or more databases 405, one or more servers 410, one or more remote computing systems 150, one or more switch devices 140, one or more point of sale (POS) terminals 210, and one or more autonomous robotic devices 100. In exemplary embodiments, the remote computing system 150 can be in communication with the databases 405, the server(s) 410, the switch devices 140, and the point of sale terminals 210, via a communications network 415. The remote computing system 150 can be in communication with the autonomous robotic devices 100 via the switch device 140. In one embodiment, the remote computing system 150 can be directly connected to the switch device 140. The remote computing system 500 can execute an automation engine 420 to implement the autonomous system 450 for performing instructed operations.

In an example embodiment, one or more portions of the communications network 415 can be an ad hoc network, a mesh network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 410 includes one or more computers or processors configured to communicate with the remote computing system 150 and the databases 405, via the network 415. The server 410 hosts one or more applications configured to interact with one or more components of the remote computing system 150 and/or facilitates access to the content of the databases 405. The databases 405 may store information/data, as described herein. For example, the databases 505 can include a cards database 425, a test cases database 435, and a physical objects database 440. The cards database 425 can include information associated with the cards disposed in the facility. The test cases database 435 can include information associated with test cases to be performed by the autonomous robot device 100. The physical objects database 440 can store information associated with physical objects. The databases 405 can be located at one or more geographically distributed locations from the remote computing system 150. Alternatively, the databases 405 can be located at the same geographically as the remote computing system 150.

In one embodiment, the switch device 140 can provide an interface 445 between the autonomous robot device 100 and the remote computing device. The remote computing system 150 interfaces with and controls the autonomous robot device 100 via the switch device 140. The remote computing system 150 can execute the automation engine 420. The automation engine 420 can query the cards database 425 to retrieve information associated with a specified card. The automation engine 420 can transmit instructions to the controller 116 of the autonomous robot device, via the interface 445, to perform a specified operation at a card reader 214 of the POS terminal 210 with the specified card. The instructions can include a location of the specified card and information associated with the operation. In response to receiving the instructions, the autonomous robot device 100 can pick-up the specified card from the location indicated in the instructions. The autonomous robot device 100 can interact with the card reader 214 perform the operation with the card at the card reader 214 of the POS terminal 210 (e.g., swipe the magnetic stripe or insert the microchip). The display 212 of the POS terminal 210 or card reader 214 can display information associated with the operation while the autonomous robot device 100 is interacting with the POS terminal 210.

As an example, the operation can include actions such as picking up the specified card, inserting the card with a magnetic chip in the magnetic chip slot of the card reader, waiting a specified time interval, inputting a pin number associated with the card using the input device of the card reader 214, waiting another specified time interval, confirming information associated with the operation rendered on the display 212 of the POS terminal 210 using the input device, removing the card from the magnetic chip slot of the card reader 214, and putting the card in the same slot in the storage location from which it was picked up. The autonomous robot device 100 can pick-up the card from the designated location using the picking unit 108 of the articulated arm 106. The sensors/image capturing device 107 disposed on the wrist 109 of the autonomous robot device 100 can determine a distance at which the card is disposed from the picking unit 108. In one embodiment, the card can be disposed in a first direction (e.g., upright). The autonomous robot device 100 can turn the wrist 109 of the articulated arm 106 in which the autonomous robot device 100 is holding the card, to turn the card in a second direction (e.g., horizontal), so that the microchip disposed on the card is facing the card reader 214. The sensors/image capturing device 107 disposed on the wrist 109 of the autonomous robot device 100 can determine a distance at which the card reader 214 is disposed from the picking unit 108. The autonomous robot device 100 can insert a portion of the card including the microchip into the microchip reader slot of the card reader 214. The autonomous robot device 100 can release the card, wait for the specified time interval, and input a pin number using the picking unit 108, on the input device of the card reader 214. The autonomous robot device 100 can wait another specified time and confirm information associated with the operation rendered on the display 212 of the POS terminal using the picking unit 108 on the input device of the card reader 214.

The image capturing devices 103 and 110 can capture still or moving images of the autonomous robot device 100 performing the operation. The still or moving images captured by the image capturing devices 103 and 110 can be streamed on the display 102 of the autonomous robot device 100. The interface 445 of the switch device 140 can replicate the display 102 of the autonomous robot device 100 onto the display 155 of the remote computing system 100. In this regard, the still or moving images streamed on the display 102 of the autonomous robot device 100 can also be displayed on the display 155 of the remote computing system 100. The image capturing devices 103, 110 of the autonomous robot device 100 can also capture still or moving images of the information rendered on the display 212 of the POS terminal 210 or card reader 214, while performing the operation. The images of the information rendered on the display 212 of the POS terminal 210 can be streamed on the display 102 of the autonomous robot device 100 and in turn on the display 155 of the remote computing system 150.

The automation engine 420 can extract and identify each action performed by the autonomous robot device 100 based on the stream of still and/or moving images. The automation engine 420 can use machine vision, image matching technology and/or other image analysis technology to extract and identify each action performed by the autonomous robot device 100 based on the stream of still and/or moving images. As a non-limiting example the automation engine 420 can be embodied as eggPlant Functional, a black-box graphical user interface (GUI) test automation tool.

The automation engine 420 can determine at least one of the actions performed by the autonomous robot device 100 is incorrect based on the identified actions from the still or moving images rendered on the display 155 of the remote computing system 150. The automation engine 420 can control the autonomous robot device 100 to perform the correct action. As an example, the automation engine 420 can determine the picking unit 108 input an incorrect pin number on the input device of the card reader 214, via a still or moving image of the autonomous robot device 100 inputting the pin number. The automation engine 420 can control the picking unit 108 of the articulated arm 106 of the autonomous robot device 100 to input the correct pin number.

As a non-limiting example, the autonomous system 450 for performing instructed operations can be implemented in a test environment for testing an operation of card readers and point-of-sale terminals in combination with different cards from different issuers. The cards can be gift cards, credit cards, debit/check cards, and/or loyalty cards. The automation engine 420 can retrieve test cases from the test cases database 435. The test cases can include various test cases to be performed at the POS terminal 210. The test cases can include one or more of, testing using the magnetic strip of the card at the card reader 214 of the POS terminal 210 and testing the microchip of the card at the card reader 214 of the POS terminal 210. The test cases can further include testing cards requiring pin numbers and/or signatures. The test cases can further include purchasing products using a specified card and/or returning products using the specified card.

As an example, the test case can include a test of attempting to purchase a product of a price higher than a limit of a credit card. The automation engine 420 can retrieve information associated with one or more products from the physical objects database. The information can include prices for the products. The prices can be of within a specified threshold. The automation engine 420 can only retrieve products sold for prices greater than the limit of the credit card. The automation engine 420 can instruct the POS terminal 210 to initiate a purchase of the product. The POS terminal 210 can render the amount due on the display 212. The automation engine 420 can query the cards database to cards with a specified limit. The automation engine 420 can instruct the autonomous robot device 100 to purchase the specified product with the specified credit card. The autonomous robot device 100 can pick-up the specified credit card and use the magnetic stripe or microchip of the credit card to interact with the card reader 214. The image capturing devices 103, 110 can capture still or moving images of the autonomous robot device 100 picking up the specified credit card, interacting with the card reader 214 and the amount due rendered on the display 212 of the POS terminal 210. The automation engine 420 can extract, identify, verify the action of picking up the specified credit card, interacting with the card reader 214, and the rendering of the amount due on the display 212. The card reader 214 can extract the information associated with the card. The information can include an identifier of the card. The POS terminal 210 can query the cards database 425 to retrieve additional information associated with the credit card, including the limit. The POS terminal 210 can determine based on the retrieved information the price of the product is greater than the limit of the credit card and the POS terminal 210 can render a rejection message on the display 212 of the POS terminal 210. The image capturing devices 103, 110 can capture images of the rejection message on rendered on the display 212. The automation engine 420 can extract, identify, and verify the POS terminal 210 correctly rejected the specified card. The automation engine 420 can validate the test case and automatically initiate the next test case.

Figure 5:
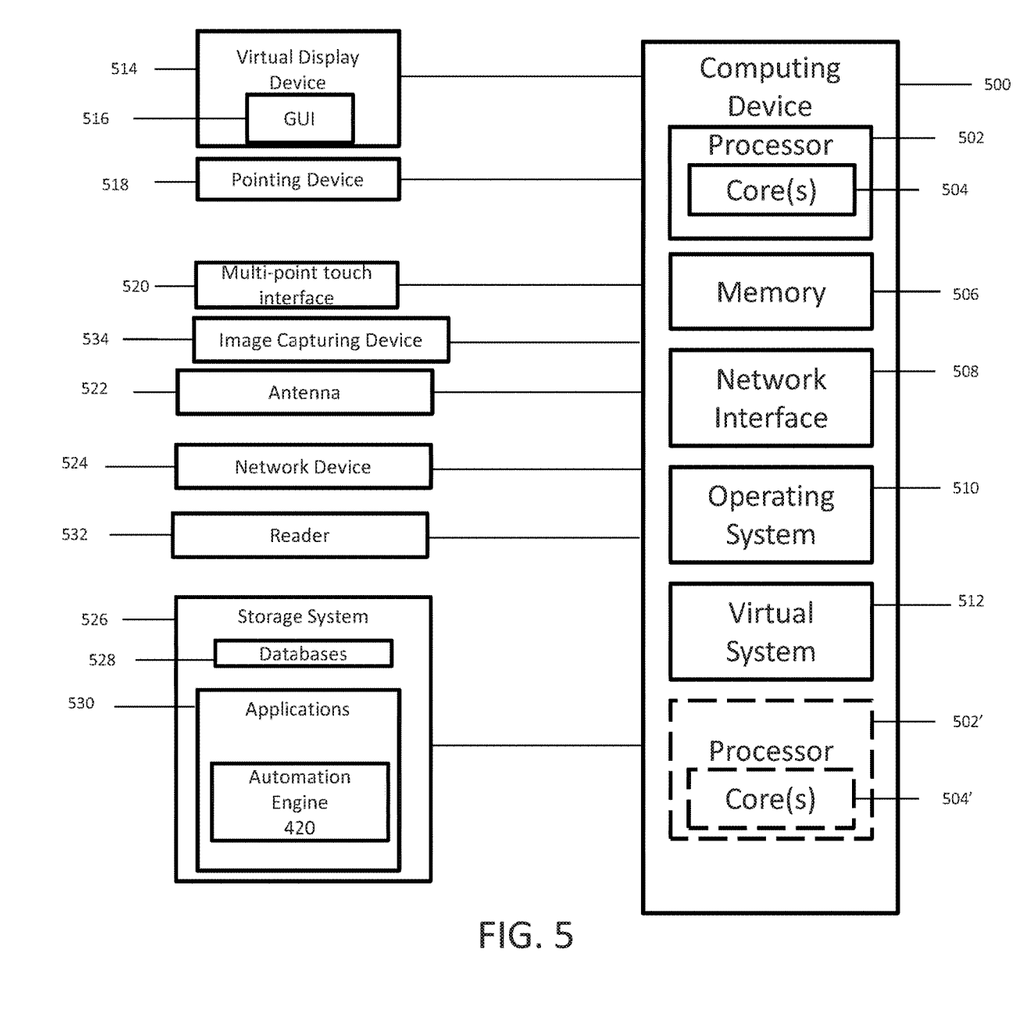
FIG. 5 is a block diagrams illustrating of an exemplary computing device in accordance with an exemplary embodiment.

FIG. 5 is a block diagram of an exemplary computing device suitable for implementing embodiments of the autonomous system for performing instructed operations. The computing device may be, but is not limited to, a smartphone, laptop, tablet, desktop computer, server or network appliance. The computing device 500 can be embodied as part of the remote computing system and/or terminal. The computing device 500 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 506 included in the computing device 500 may store computer-readable and computer-executable instructions or software (e.g., applications 530 such as the automation engine 420) for implementing exemplary operations of the computing device 500. The computing device 500 also includes configurable and/or programmable processor 502 and associated core(s) 504, and optionally, one or more additional configurable and/or programmable processor(s) 502' and associated core(s) 504' (for example, in the case of computer systems having multiple processors/cores), for executing computer-readable and computer-executable instructions or software stored in the memory 506 and other programs for implementing exemplary embodiments of the present disclosure. Processor 502 and processor(s) 502' may each be a single core processor or multiple core (504 and 504') processor. Either or both of processor 502 and processor(s) 502' may be configured to execute one or more of the instructions described in connection with computing device 500.

Virtualization may be employed in the computing device 500 so that infrastructure and resources in the computing device 500 may be shared dynamically. A virtual machine 512 may be provided to handle a process running on multiple processors so that the process appears to be using only one computing resource rather than multiple computing resources. Multiple virtual machines may also be used with one processor.

Memory 506 may include a computer system memory or random access memory, such as DRAM, SRAM, EDO RAM, and the like. Memory 506 may include other types of memory as well, or combinations thereof. The computing device 500 can receive data from input/output devices such as, a reader 534 and an image capturing device 532.

A user may interact with the computing device 500 through a visual display device 514, such as a computer monitor, which may display one or more graphical user interfaces 516, multi touch interface 520 and a pointing device 518.

The computing device 500 may also include one or more storage devices 526, such as a hard-drive, CD-ROM, or other computer readable media, for storing data and computer-readable instructions and/or software that implement exemplary embodiments of the present disclosure (e.g., applications 530 such as the automation engine 420). For example, exemplary storage device 526 can include one or more databases 528 for storing information regarding the physical objects, cards and test cases. The databases 528 may be updated manually or automatically at any suitable time to add, delete, and/or update one or more data items in the databases.

The computing device 500 can include a network interface 508 configured to interface via one or more network devices 524 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections, controller area network (CAN), or some combination of any or all of the above. In exemplary embodiments, the remote computing system can include one or more antennas 522 to facilitate wireless communication (e.g., via the network interface) between the computing device 500 and a network and/or between the computing device 500 and other computing devices. The network interface 508 may include a built-in network adapter, network interface card, PCMCIA network card, card bus network adapter, wireless network adapter, USB network adapter, modem or any other device suitable for interfacing the computing device 500 to any type of network capable of communication and performing the operations described herein.

The computing device 500 may run any operating system 510, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 500 and performing the operations described herein. In exemplary embodiments, the operating system 510 may be run in native mode or emulated mode. In an exemplary embodiment, the operating system 510 may be run on one or more cloud machine instances.

Figure 6:
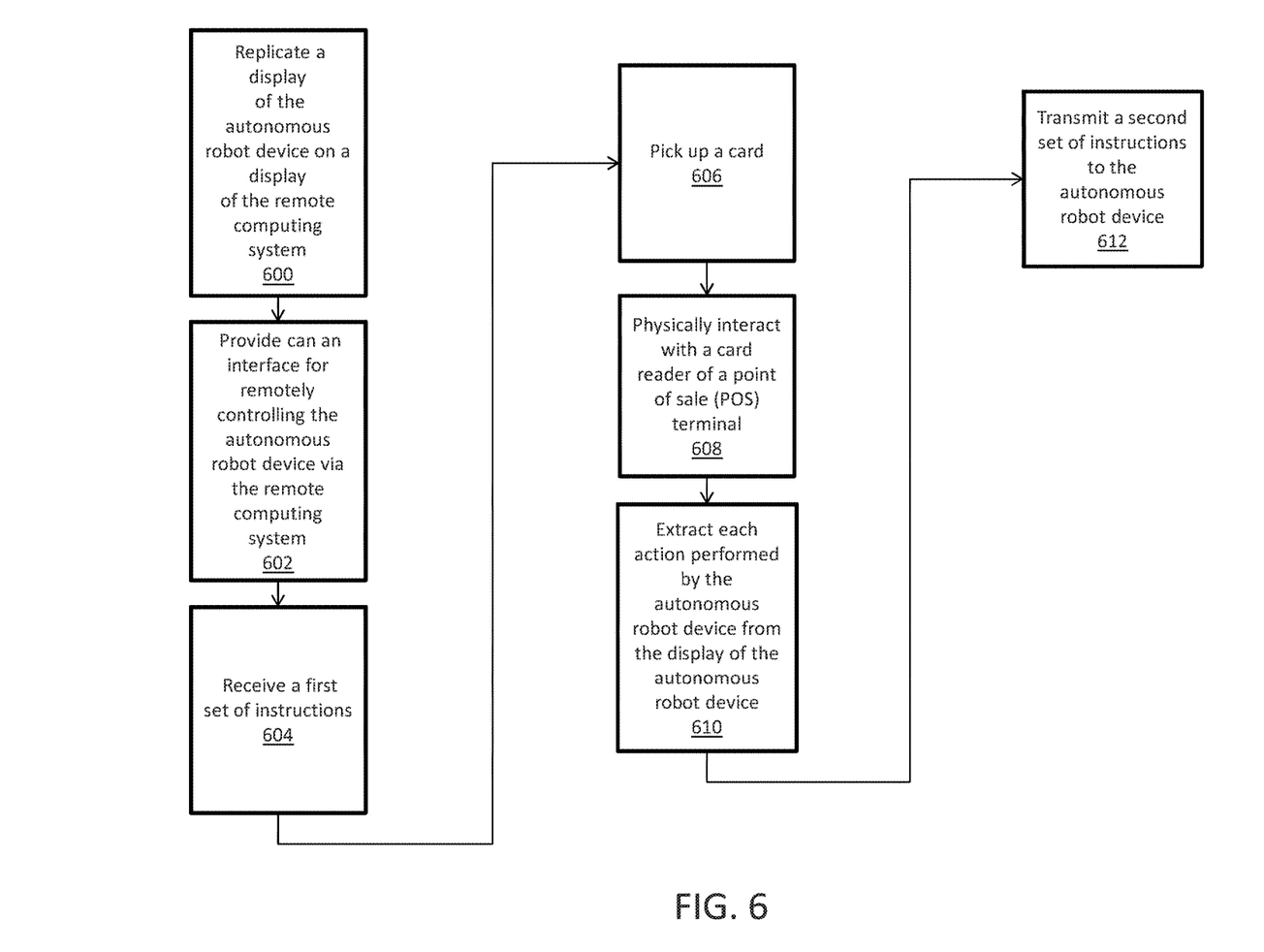
FIG. 6 is a flowchart illustrating an exemplary process of an autonomous system for performing instructed operations in accordance with an exemplary embodiment.

FIG. 6 is a flowchart illustrating an example process of the embodiments of the autonomous system for performing instructed operations according to the present disclosure. In operation 600, a switch device (e.g., switch device 140 as shown in FIGS. 1, 4) in electrical communication with an autonomous robot device (e.g., autonomous robot device 100 as shown in FIGS. 1-2, 4) and a remote computing system (e.g., remote computing system 150 as shown in FIGS. 1, 4), can replicate a display (e.g., display 102 as shown in FIGS. 1, 4) of the autonomous robot device on a display (e.g., display 155 as shown in FIGS. 1, 4) of the remote computing system. The autonomous robot device can include a controller (e.g., controller 116 as shown in FIGS. 1, 4), an articulated arm (e.g., articulated arm 106 as shown in FIGS. 1, 4), and an image capture device (e.g., image capturing devices 103, 110 as shown in FIGS. 1, 4). In operation 602, the switch device provides can an interface for remotely controlling the autonomous robot device via the remote computing system. In operation 604, the autonomous robot device can receive a first set of instructions from the remote computing system, via an interface (e.g., interface 445 as shown in FIG. 4) of the switch device. In operation 606, the autonomous robot device can pick up a card (e.g., card 202 as shown in FIGS. 2-3) with the articulated arm in response to the first set of instructions. The card can include a magnetic stripe (e.g., magnetic stripe 308 as shown in FIG. 3) or a microchip (e.g., microchip 306 as shown in FIG. 3). In operation 608, the autonomous robot device can control the articulated arm to move the at least one card to physically interact with a card reader (e.g., card reader 214 as shown in FIGS. 2, 4) of a point of sale (POS) terminal (e.g., POS terminal 210 as shown in FIGS. 2, 4) including a processor in communication with the card reader, to facilitate reading of the magnetic stripe or microchip by the card reader in response to the first set of instructions. In operation 610, the remote computing system can autonomously extract each action performed by the autonomous robot device from the display of the autonomous robot device in response to replication of the display of the autonomous robot device on the display of the remote computing system, via the switch device. In operation 612, the remote computing system can transmit a second set of instructions to the autonomous robot device via the interface of the switch device in response to detection of specified data in the display of the autonomous robot device that is replicated on the display of the remote computing system after the autonomous robot performs each action associated with the first set of instructions.

Figure 7:
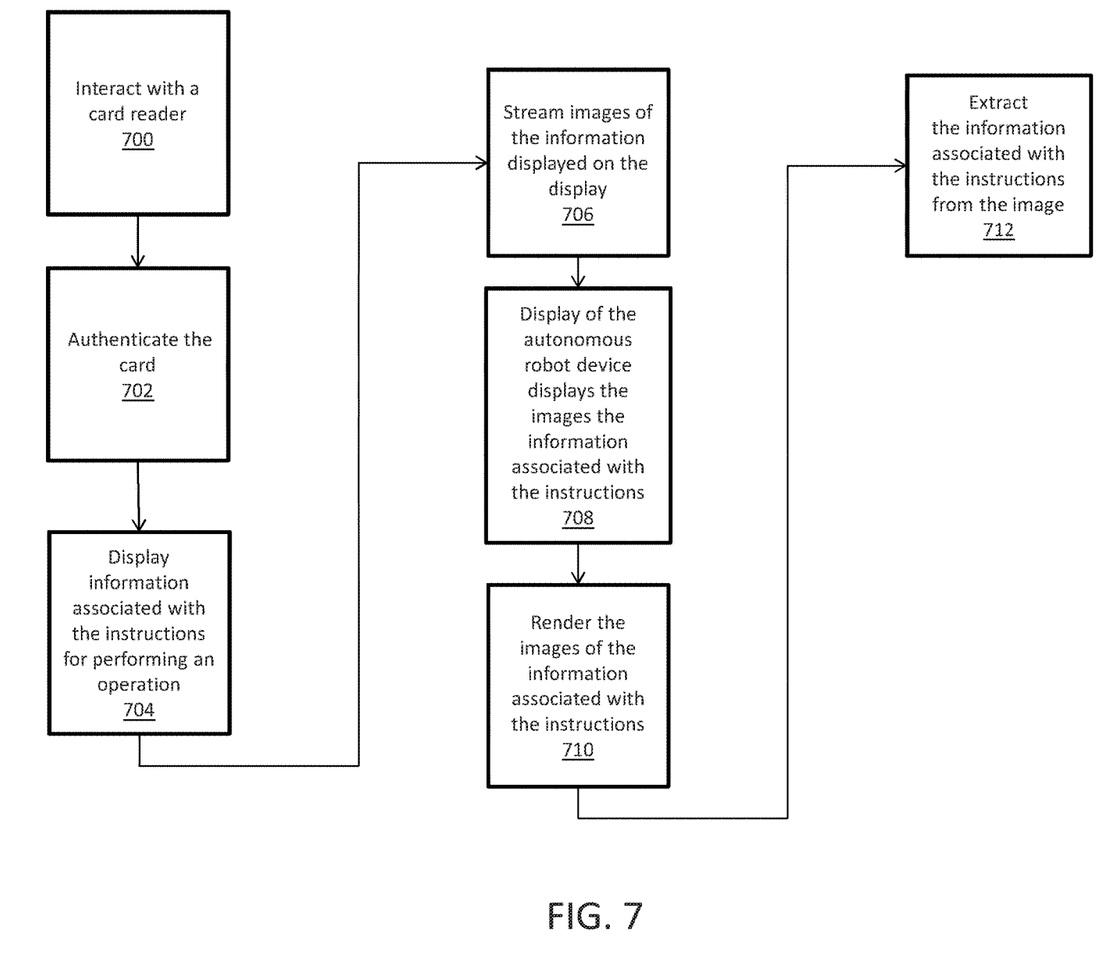
FIG. 7 is a flowchart illustrating an exemplary process of an autonomous system for performing instructed operations in accordance with an exemplary embodiment.

FIG. 7 is a flowchart illustrating an example process of the embodiments of the autonomous system for performing instructed operations according to the present disclosure. In operation 700, an autonomous robot device (e.g., autonomous robot device 100 as shown in FIGS. 1-2, 4) can interact with a card reader (e.g., card reader 214 as shown in FIGS. 2, 4) by swiping the magnetic stripe (e.g., magnetic strip 308 as shown in FIG. 3) or inserting the microchip (e.g., microchip 306 as shown in FIG. 3) of the card (e.g., card 202 as shown in FIG. 3) at the card reader using an articulated arm (e.g., articulated arm 106 as shown in FIGS. 1, 4) of the autonomous robot device. In operation 702, the card reader can authenticate the card in response from extracting and reading data encoded in the magnetic stripe or the microchip of the card. In operation 704, the display (e.g., display 212 as shown in FIGS. 2, 4) of the point of sale terminal or card reader (e.g., POS terminal 210 or card reader 214 as shown in FIGS. 2, 4) can display information associated with the instructions for performing an operation, in response to the at least one autonomous robot device interacting with the card reader. In operation 706, the image capturing device (e.g., image capturing devices 103, 110 as shown in FIGS. 1, 4) of the autonomous robot device, can stream images of the information displayed on the display of the POS terminal or card reader. In operation 708, the display (e.g., display 102 as shown in FIGS. 1, 4) of the autonomous robot device can display the images of the information associated with the instructions displayed on the display of the point of sale terminal or card reader. In operation 710, the display (e.g., display 155 as shown in FIGS. 1, 4) of the remote computing system (e.g., remote computing system 150 as shown in FIGS. 1, 4) can render the images of the information associated with the instructions. In operation 712, the remote computing system can extract (identify and verify) the information associated with the instructions from the image.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. An autonomous system for performing instructed operations, the system comprising:
    a point-of-sale terminal including a processor and a card reader in electrical communication with the processor;
    an autonomous robot device, the autonomous robot device includes a controller, an articulated arm, an image capture device, and a first display;
    a remote computing system having a second display;
    a switch device in electrical communication with the autonomous robot device and the remote computing system, the switch device being configured to replicate the first display on the second display and provide an interface for controlling the autonomous robot device;
    wherein the autonomous robot device is configured to (i) receive a first set of instructions from the remote computing system via the interface of the switch device; (ii) pick up the at least one card from a plurality of cards using the articulated arm in response to the first set of instructions, each of the plurality of cards including at least one of a magnetic stripe or a microchip, and (ii) control the articulated arm to move the at least one card to physically interact with the card reader to facilitate reading of the magnetic stripe or microchip by the card reader in response to the first set of instructions;
    wherein the remote computing system is configured to autonomously extract each action performed by the autonomous robot device from the first display in response to replication of the first display on the second display, and autonomously transmit a second set of instructions to the autonomous robot device via the interface of the switch device in response to detection of specified data in the first display that is replicated on the second display after the autonomous robot performs each action associated with the first set of instructions.

2. The system in claim 1, wherein the switch device is a Keyboard Video Mouse (KVM) switch device.

3. The system of claim 1, wherein the autonomous robot device is configured to interact with the card reader by swiping the magnetic stripe of the at least one card at the card reader or inserting the microchip of the at least one card into the card reader.

4. The system of claim 3, wherein the card reader is configured to authenticate the at least one card in response to extracting and reading data encoded in the magnetic stripe or the microchip of the at least one card.

5. The system of claim 1, wherein the point-of-sale terminal includes a third display, the third display configured to display information associated with the first set of instructions, in response to the autonomous robot device interfacing with the card reader.

6. The system of claim 5, wherein the autonomous robot device is configured to:
    stream, via the image capturing device of the autonomous robot device, one or more images including the information displayed on the third display;
    display, via the first display of the autonomous robot device, the one or more images including the information associated with the first set of instructions displayed on the third display.

7. The system of claim 6, wherein the second display of the remote computing system is configured to render the one or more images including the information associated with the first set of instructions.

8. The system of claim 7, wherein the remote computing system is configured to:
    extract the information associated with the first set of instructions from the image.

9. The system of claim 1, wherein the card reader includes a data input device.

10. The system of claim 9, wherein at least one action performed by the autonomous robot device includes inputting data using the data input device of the card reader.

11. A method for autonomously performing instructed operations, the method comprising:
    replicating, via a switch device in electrical communication with an autonomous robot device and a remote computing system, a first display of the autonomous robot device on a second display of the remote computing system, the further including a controller, an articulated arm, and an image capture device;
    providing, via the switch device, an interface for remotely controlling the autonomous robot device via the remote computing system;
    receiving, by the autonomous robot device, a first set of instructions from the remote computing system via the interface of the switch device;
    picking up, by the autonomous robot device, at least one card from a plurality of cards with the articulated arm in response to the first set of instructions, each of the plurality of cards including at least one of a magnetic stripe or a microchip;
    controlling, via the autonomous robot device, the articulated arm to move the at least one card to physically interact with a card reader of a point of sale terminal including a processor in communication with the card reader, to facilitate reading of the magnetic stripe or microchip by the card reader in response to the first set of instructions;
    autonomously extracting, via the remote computing system, each action performed by the autonomous robot device from the first display in response to replication of the first display on the second display via the switch device; and
    transmitting, by the remote computing system, a second set of instructions to the autonomous robot device via the interface of the switch device in response to detection of specified data in the first display that is replicated on the second display after the autonomous robot performs each action associated with the first set of instructions.

12. The method in claim 11, wherein the switch device is a Keyboard Video Mouse (KVM) switch device.

13. The method of claim 11, further comprising, interacting with the card reader by swiping the magnetic stripe of the at least one card at the card reader or inserting the microchip of the at least one card in the card reader via the articulated arm of the autonomous robot device.

14. The method of claim 13, further comprising, authenticating, via the card reader, the at least one card in response from extracting and reading data encoded in the magnetic stripe or the microchip of the at least one card.

15. The method of claim 11, further comprising displaying, via a third display coupled to the point of sale terminal, information associated with the first set of instructions, in response to the at least one autonomous robot device interacting with the card reader.

16. The method of claim 15, further comprising:
streaming, via the image capturing device of the autonomous robot device, one or more images of the information displayed on the third display;
displaying, via the first display of the autonomous robot device, the one or more images of the information associated with the first set of instructions displayed on the third display.

17. The method of claim 16, further comprising rendering, via the second display of the remote computing system, the one or more images of the information associated with the first set of instructions.

18. The method of claim 17, further comprising:
extracting, via the remote computing system, the information associated with the first set of instructions from the image.

19. The method of claim 11, wherein the card reader includes a data input device.

20. The method of claim 19, wherein at least one action includes inputting data using the data input device of the card reader.

* * * * *

UNITED STATES PATENT AND TRADEMARK OFFICE
CERTIFICATE OF CORRECTION

PATENT NO. : 11,123,871 B2
APPLICATION NO. : 16/395418
DATED : September 21, 2021
INVENTOR(S) : Christopher D. Johnson et al.

Page 1 of 1

It is certified that error appears in the above-identified patent and that said Letters Patent is hereby corrected as shown below:

In the Claims

Column 11, Line 30, Claim 1, delete "(ii)" and insert --(iii)--, therefor.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*